US012260753B1

(12) United States Patent
Smith et al.

(10) Patent No.: US 12,260,753 B1
(45) Date of Patent: Mar. 25, 2025

(54) AUGMENTED REALITY INTERFACE FOR VISUALIZING AND COORDINATING DISASTER EVENT RESPONSE EFFORTS

(71) Applicant: UNITED SERVICES AUTOMOBILE ASSOCIATION (USAA), San Antonio, TX (US)

(72) Inventors: Arthur Quentin Smith, Fredericksburg, TX (US); Oscar Guerra, San Antonio, TX (US); Robert Lee Black, San Antonio, TX (US); Timothy Blair Chalmers, San Antonio, TX (US); Justin Dax Haslam, San Antonio, TX (US); Noe Alberto Martinez, San Antonio, TX (US); Jon D. McEachron, Boerne, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 84 days.

(21) Appl. No.: 18/128,141

(22) Filed: Mar. 29, 2023

Related U.S. Application Data

(60) Provisional application No. 63/325,458, filed on Mar. 30, 2022.

(51) Int. Cl.
*H04W 4/90* (2018.01)
*G08G 1/081* (2006.01)
*G08G 1/087* (2006.01)
*G08G 1/095* (2006.01)

(52) U.S. Cl.
CPC ............. *G08G 1/087* (2013.01); *G08G 1/081* (2013.01); *G08G 1/095* (2013.01)

(58) Field of Classification Search
None
See application file for complete search history.

(56) References Cited

U.S. PATENT DOCUMENTS

2007/0083409 A1* 4/2007 Dilbeck ................. G06Q 10/06 340/506
2018/0199179 A1* 7/2018 Rauner .................. G08B 25/10
2019/0051178 A1* 2/2019 Priev .................... G05D 1/0214
2019/0392712 A1* 12/2019 Ran ...................... G08G 1/0116
2022/0014895 A1* 1/2022 Horelik .............. G08B 21/0261

* cited by examiner

*Primary Examiner* — John F Mortell
(74) *Attorney, Agent, or Firm* — Fletcher Yoder, P.C.

(57) ABSTRACT

A method includes receiving, via at least one processor, data from a plurality of data sources disposed within an area, the data including area data, emergency event data, and emergency resource data; generating, via the at least one processor, based on the data, a visualization including a graphical representation of the area based on the area data, the emergency event data, the emergency resource data, or any combination thereof; determining, based on an interaction with the visualization, an emergency response plan for a vehicle, wherein the response plan includes an evacuation plan; sending the emergency response plan to a vehicle system associated with the vehicle, wherein the vehicle system is configured to: determine a location associated with the emergency response plan; determine a route to the location; and send instructions to one or more traffic assets along the route to the location, the instructions configured to cause the one or more traffic assets to adjust one or more signals.

20 Claims, 6 Drawing Sheets

AUGMENTED REALITY INTERFACE FOR VISUALIZING AND COORDINATING DISASTER EVENT RESPONSE EFFORTS

CROSS-REFERENCE TO RELATED APPLICATIONS

This application claims priority to and the benefit of U.S. Provisional Application No. 63/325,458, entitled "Augmented Reality Interface for Visualizing and Coordinating Disaster Event Response Efforts," filed Mar. 30, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Emergency responses to events such as natural disasters, terror attacks, social unrest, and the like may require coordinated planning for a multitude of governmental and/or non-governmental entities. A wide range of data including location information regarding safe areas, unsafe areas and potential evacuation routes between the two, data regarding the nature of the event, data regarding the potential impact of the event, data regarding the extent of the damage caused by the event, and so on may help in facilitating an effective response strategy.

However, the various entities involved in the response planning may not have access to such crucial information. Indeed, the entities may have conflicting or contradictory information which may produce logistical issues and the like that may frustrate response efforts and lead to inefficient or ineffective response strategies.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes receiving, via at least one processor, data from a plurality of data sources disposed within an area, the data including area data, emergency event data, and emergency resource data; generating, via the at least one processor, based on the data, a visualization including a graphical representation of the area based on the area data, the emergency event data, the emergency resource data, or any combination thereof; determining, based on an interaction with the visualization, an emergency response plan for a vehicle, wherein the response plan includes an evacuation plan; sending the emergency response plan to a vehicle system associated with the vehicle, wherein the vehicle system is configured to: determine a location associated with the emergency response plan; determine a route to the location; and send instructions to one or more traffic assets along the route to the location, the instructions configured to cause the one or more traffic assets to adjust one or more signals.

In another embodiment, a system includes a plurality of devices configured to receive and transmit data, the data including area data, emergency event data, and emergency resource data. The system includes an event assessment system configured to: receive the data from the plurality of devices; generate a visualization based on at least a portion of the data, the visualization including a graphical representation of the area based on the area data, the emergency event data, and the emergency resource data. the event assessment system is configured to determine a response plan based on an interaction with the visualization, wherein the response plan includes an evacuation plan. The event assessment system is configured to send the data to a vehicle, causing the vehicle to: determine a location associated with the response plan; determine a route to the location; and send instructions to one or more traffic assets along the route to the location, the instructions causing the one or more traffic assets to emit a signal.

In yet another embodiment, a tangible, non-transitory, computer-readable medium includes computer-executable instructions that, when executed by one or more processors, cause the one or more processors to: receive, via at least one processor, data from a plurality of data sources disposed within an area, the data including area data, emergency event data, and emergency resource data; generate, via the at least one processor, based on the data, a visualization including a graphical representation of the area based on the area data, the emergency event data, the emergency resource data, or any combination thereof; determine, based on an interaction with the visualization, an emergency response plan for a vehicle, the emergency response plan including an evacuation plan; send the emergency response plan to a vehicle system associated with the vehicle, wherein the vehicle system is configured to: determine a location associated with the emergency response plan; determine a route to the location; and send instructions to one or more traffic assets along the route to the location, the instructions configured to cause the one or more traffic assets to adjust one or more signals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
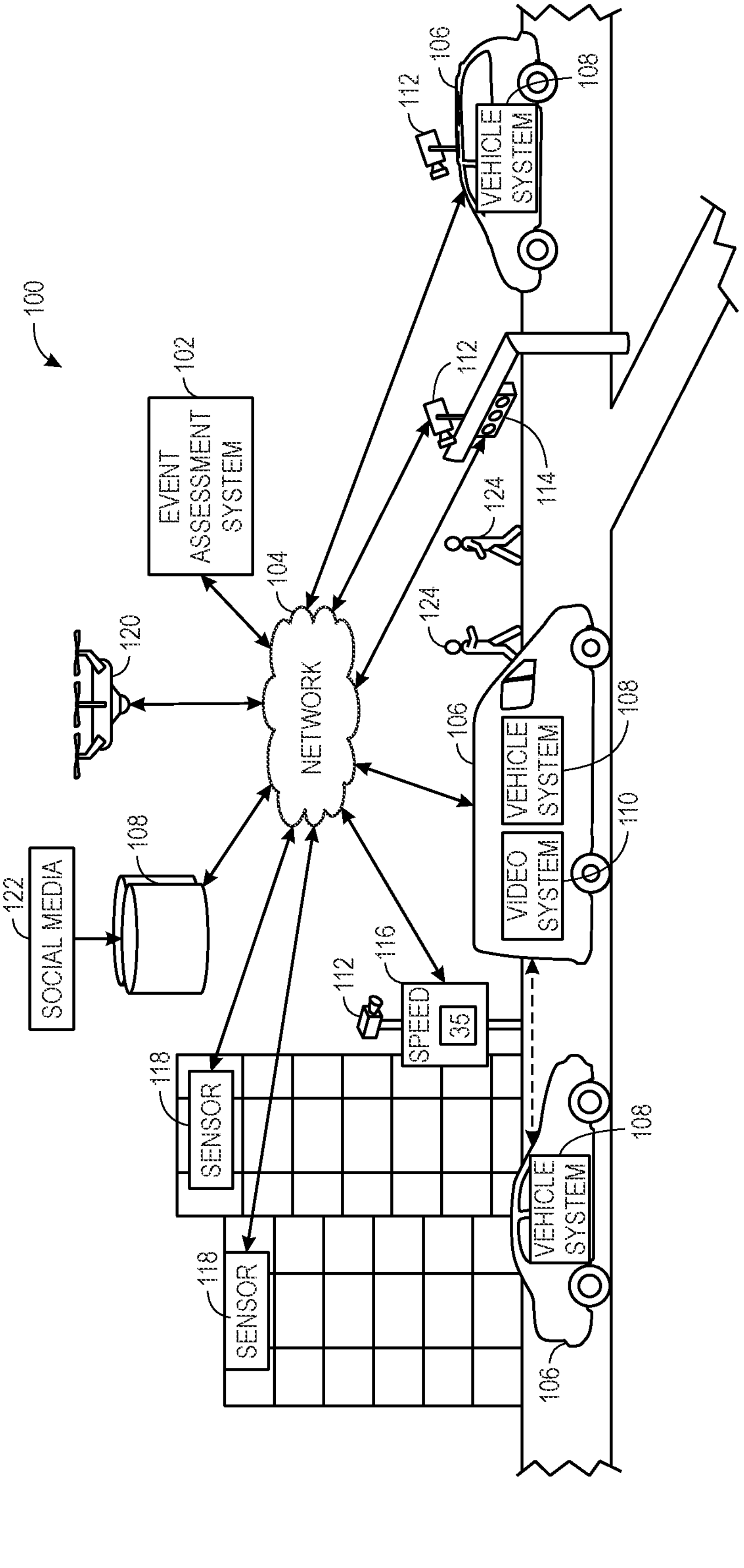
FIG. 1 is a diagram of a system for sending relevant data to and receiving data from an event assessment system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Effective response strategies for emergency events (e.g., natural disasters, terror attacks, social unrest) may involve coordinated planning with a multitude of governmental entities (e.g., a law enforcement department/agency, a fire department, the United States Coast Guard, and so on) and/or non-governmental entities (e.g., businesses, non-profit organizations). Data relevant to emergency response strategies such as area data, event data, or emergency resource data may assist in effectuating a response strategy that will help those in need (e.g., locating food, shelter, rescue) during the event. Area data may include information (e.g., location data, visual data) for surrounding structures (e.g., buildings, dwelling, bridges) and the conditions of such structures, weather data, movement/motion conditions (vehicle traffic, pedestrian traffic), list of potential/likely people in an area, activity level of the prior to the event (e.g., normal, high, low, varying, stable), presence of vehicles (number, location, size, type), and ensuring that bridges, tunnels, ferries, and rail crossings are operable and open to the emergency vehicle(s) before, during, and/or after the event, and the like.

The event data may include data regarding the nature of the event (e.g., information indicating that the event is a weather event, seismic event, social unrest event), data regarding the extent of damage caused or that may be potentially caused by the event, such as debris, falling objects, swaying objects, fluid conditions (e.g., flow rate), ground conditions (e.g., vibrations, foliage information, wetness, snow, ice), light conditions (e.g., degree of darkness/light, color(s), light stability, degree of light fluctuations, brightness), sound conditions (e.g., level of noise, type of sound, such as burning, gunfire, explosion, human voices), availability of utilities (e.g., water, electric, gas, drainage), activity level of the area during/after the event (e.g., normal, high, low, varying, stable), and so on. Emergency resource data may include data regarding the position, number, and/or type of emergency personnel, vehicles, and equipment as well as data regarding an emergency response strategy by various entities, such as indications of safe areas, unsafe areas, potential evacuation routes from the unsafe areas to the safe areas, and so on.

However, the various entities involved in the emergency response planning may not have access to such data. Indeed, the entities may be missing the relevant data or may have conflicting or contradictory data, which may frustrate response efforts and may lead to inefficient or ineffective response strategies. For instance, a local police department may receive inaccurate or outdated information regarding flood zones during a weather event and, as a result, may increase emergency response time by choosing an inefficient route.

Additionally, issues may arise from inefficient data collection, processing, and/or organization. For example, historical flood data for an area may be kept in paper records or may be stored in local memory elements (e.g., hard drives, floppy disks). Even if an entity (e.g., a local police department) was able to obtain the information, it may be difficult or impossible to use the historical data in a way that may assist the entity in developing an emergency response.

With the foregoing in mind, this disclosure is directed to systems and processes for generating an interactive three-dimensional (3D) augmented reality (AR) or virtual reality (VR) visualization for facilitating emergency event response strategies. An event assessment system may receive predictions (e.g., made by artificial intelligence (AI) or machine learning algorithms), real-time and/or historical relevant data, such as area data, event data, and/or emergency resource data. The event assessment system may generate the visualization (e.g., an AR virtual 3D map of the area, events, and emergency responses, tables and/or graphs displaying visualized data, and so on) including various layers of data. For example, one data layer may include the area data (e.g., a visualization of a city block, neighborhood, or city street). Another data layer may include the event data (e.g., the location of a hurricane, wind speed and flooding due to the hurricane). Yet another data layer may include police data (e.g., location of police officers and personnel, location of police vehicles). Further, the police data may be bundled with other emergency responders (e.g., firefighters, U.S. Coast Guard) to generate an emergency resource data layer.

Using one or more of these layers, which may be selected by a user of the event assessment system 102, the event assessment system may generate the visualizations. The visualizations may be interactive and manipulable to provide ease in visualizing the data layers and to facilitate more efficient and effective response strategies. While data layers are discussed, it should be noted that, in various embodiments, the data may be represented in any suitable visualization scheme. That is, the embodiments described herein should not be limited to layers, as methods of presenting complex systems and data may be employed. For instance, the different type of data may be presented as stovepipe data models, as a single "holistic" system combined with user filters or different views, or the like. Indeed, the presentation of data may be structured and presented hierarchically, relationally, indexed-sequentially, and the like.

By way of introduction, FIG. 1 illustrates a diagram of a system 100 (e.g., a smart city) for sending data to and receiving data from an event assessment system 102, according to an embodiment of the present disclosure. Referring to FIG. 1, the system 100 may include a network 104 that may receive relevant data from a variety of data sources and transmit the data received from the data sources to the event assessment system 102. As will be discussed in greater detail in FIGS. 3-6 below, the event assessment system 102 may process the relevant data and generate a visualization including multiple layers of area data, event data, emergency resource data, and so on. Moreover, the event assessment system 102 may coordinate or automate certain actions or commands in view of the various layers of data presented via the visualization. That is, the event assessment system 102 may generate a coordinated set of instructions to various devices (e.g., sprinklers, drones, dams) to modify operations in conjunction with each other to accommodate or help alleviate traffic due to the event.

The network 104 may receive data from vehicles 106. The vehicles 106 may send data to the network 104 via a vehicle system 108. For example, the vehicle system 108 may include speed data or location data, which the event assessment system 102 may use to determine a level of traffic in the area at a given moment. In certain embodiments, the vehicle 106 may have a video system 110 (e.g., the vehicle 106 may be a news station vehicle equipped with audiovisual equipment), which may capture real-time area data (e.g., vehicle traffic in the area, pedestrian traffic in the area, weather conditions) at a street level and send the captured data to the event assessment system 102. In some embodiments, vehicle 106 may be affixed with a camera 112 (e.g., a 360-degree camera as used by mapping vehicles) to capture real-time area data.

The system 100 may also include the cameras 112 affixed to or embedded in a traffic light 114 or a speed detector 116. The traffic light 114 (or traffic sign, or dedicated data collection device like a traffic collection tower) and the speed detector 116 may send collected data to the event assessment system 102 via the network 104. For example, the traffic light 114 may send data regarding the number of vehicles running red lights, yellow lights, and green lights. The traffic light 114 may also receive commands (e.g., from the event assessment system 102) causing the traffic light 114 to turn red, yellow, green, flash yellow, flash red, and so on. By controlling the traffic lights during an emergency event, emergency responders may be able to disperse, stop, or reroute traffic to facilitate an emergency response plan. The speed detector 116 may send data to the event assessment system 102 regarding the posted speed limit in the area, and the speed detector 116 may receive commands (e.g., from the event assessment system 102) causing the speed detector 116 to dynamically change the posted speed limit of the area (e.g., to slow the traffic in the area to facilitate an emergency response). While traffic lights are discussed, it should be noted that any controllable assets (e.g., electronic buoys, or other markers or indicators that may be disposed within or alongside a waterway, air traffic control lights, and so on) may be employed in the embodiments described herein.

The event assessment system 102 may collect, via the network 104, data from sensors 118. The sensors 118 may be coupled to structures (e.g., buildings, bridges, roads, and so on). The sensors 118 may include a vibration sensor, a seismometer, a seismograph (e.g., to detect and record seismic events, volcanic activity, explosions, collisions, falling objects, etc.), water level sensors, humidity sensors, heat sensors, infrared sensors, or any other appropriate sensor. For example, a water sensor may be used to determine flooding on a street including depth and force/speed, while heat sensors and/or infrared sensors may assist in locating a fire, determining where the fire may have originated, determining in which direction the fire is traveling, and so on.

The event assessment system 102 may also collect data from and/or about individuals 124 in the area. For example, the individuals 124 may be wearing, medical, biometric and/or location tracking devices. The event assessment system 102 may track the location and health of the individuals 124 via the biometric and/or location tracking devices, which may enable faster extraction of the individuals 124 from a hazardous area, faster supply delivery to the individuals, and so on. The biometric sensors may detect a heart rate, physical activity (e.g., steps, exercise minutes), standing activity, and the like.

Relevant data may also be gathered from social media 122. Using web crawlers or other web monitoring tools, area data (e.g., regarding traffic), event data (e.g., text-based social media posts, pictures, videos of weather events, seismic events, conflagrations), or emergency resource data (e.g., text-based social media posts, pictures, videos of emergency responders) may be gathered and sent to the event assessment system 102 to facilitate an emergency response strategy.

In addition to the devices described above, in some embodiments, drones 120 (e.g., unmanned aerial vehicles) may be employed to collect traffic data, image data, and the like. The drones 120 may be ground-based drones that traverse roads and different terrains via the air or surface to collect various types of data. In some situations, the drones may be waterborne. Other drones might traverse fluid pipes, gas pipes, drainage pipes, chimneys, caves, service tunnels, crawl spaces, attics, basements, parking garages, subways, etc. In this way, the drones may be positioned in the area and provide data to the event assessment system 102 or other suitable device to perform the embodiments described herein.

Figure 2:
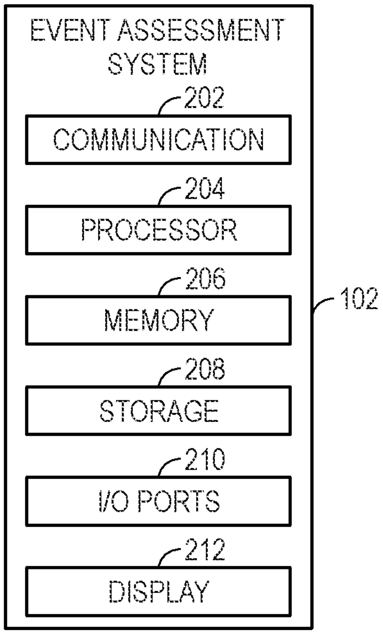
FIG. 2 is a block diagram of example components within the event assessment system, in accordance with aspects of the present disclosure.

FIG. 2 is a block diagram of example components within the event assessment system 102, according to an embodiment of the present disclosure. For example, the event assessment system 102 may include a communication component 202, a processor 204, a memory 206, a storage 208, input/output (I/O) ports 210, a display 212, and the like. The communication component 202 may be a wireless or wired communication component that may facilitate communication between the event assessment system 102, the traffic devices, the network 104, and the like. Additionally, the communication component 202 may facilitate data transfer to the event assessment system 102, such that the event assessment system 102 may receive data from the other components depicted in FIG. 1 and the like.

The processor 204 may be any type of computer processor or microprocessor capable of executing computer-executable code. The processor 204 may also include multiple processors that may perform the operations described below. The memory 206 and the storage 208 may be any suitable articles of manufacture that can serve as media to store processor-executable code, data, or the like. These articles of manufacture may represent computer-readable media (e.g., any suitable form of memory or storage) that may store the processor-executable code used by the processor 204 to perform the presently disclosed techniques. The memory 206 and the storage 208 may also be used to store data described, various other software applications for analyzing the data, and the like. The memory 206 and the storage 208 may represent non-transitory computer-readable media (e.g., any suitable form of memory or storage) that may store the processor-executable code used by the processor 204 to perform various techniques described herein. It should be noted that non-transitory merely indicates that the media is tangible and not a signal.

The I/O ports 210 may be interfaces that may couple to other peripheral components such as input devices (e.g., keyboard, mouse), sensors, input/output (I/O) modules, and the like. The display 212 may operate to depict a representation of the 3D AR or VR visualizations associated with software or executable code being processed by the processor 204. In one embodiment, the display 212 may be a touch display capable of receiving inputs from a user of the event assessment system 102. In other embodiments, the display 212 may be capable of generating a manipulable 3D AR or VR projection of one or more data layers, as will be discussed in greater detail in FIG. 4 below. It should be noted that the components described above with regard to the event assessment system 102 are exemplary components and the event assessment system 102 may include additional or fewer components as shown. In addition, although the components are described as being part of the event assessment system 102, the components may also be part of any suitable computing device described herein such as the vehicle system 108, the video system 110, the speed detector 116, the traffic light 114, the sensor 118, and the like to perform the various operations described herein.

Keeping this in mind, the present embodiments may enable the event assessment system 102 to collect data from the variety of data sources disposed in an area (e.g., a smart city), and use that data to facilitate one or more emergency response plans from governmental (e.g., local police departments, local fire departments, the U.S. Coast Guard, and so on) and/or non-governmental emergency response organizations. For example, the event assessment system 102 may gather data regarding a hurricane in an area, and share the data with multiple emergency response organizations. By providing a variety of emergency response organizations with consistent and robust emergency data that may be updated in real-time, and by providing an interactive visualization of the data, the event assessment system 102 may enable the emergency response organizations to coordinate and effectuate their respective emergency response plans in a more efficient and effective manner.

Figure 3:
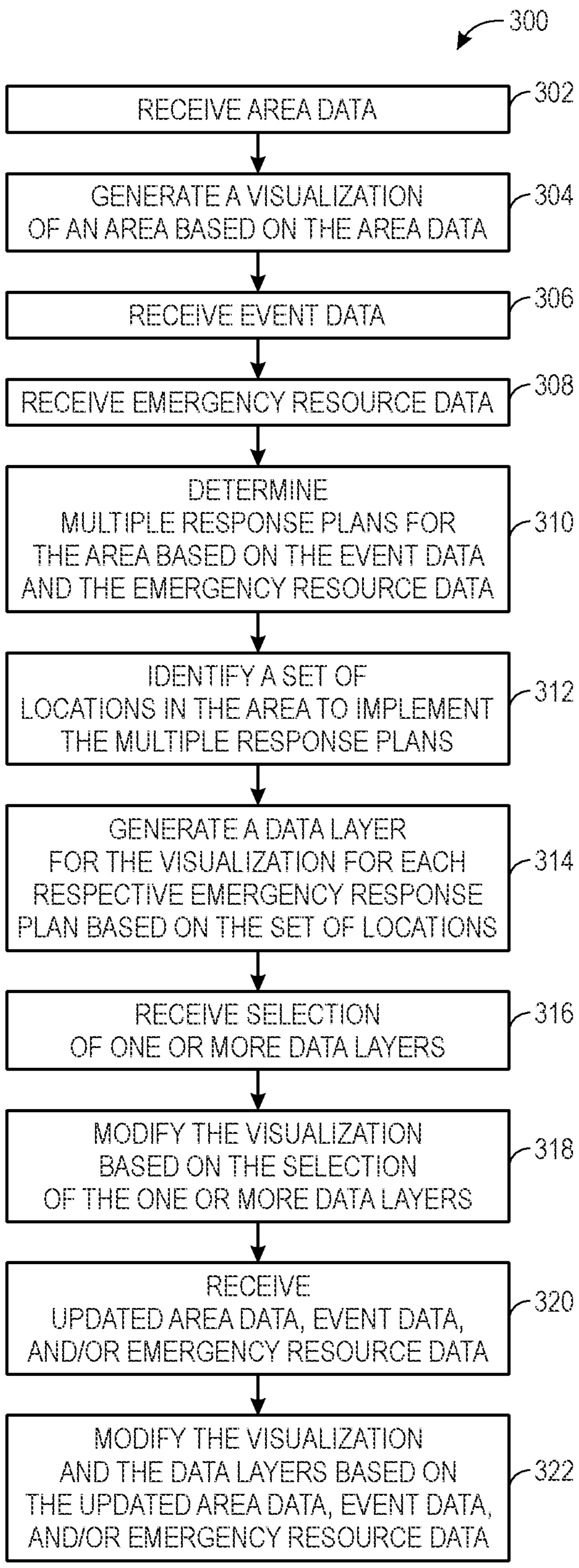
FIG. 3 is a flowchart of a method for receiving the relevant data and generating, based on the relevant data, one or more visualizations, in accordance with aspects of the present disclosure.

FIG. 3 is a flowchart of a method 300 for receiving the relevant data and generating, based on the relevant data, one or more visualizations, according to an embodiment of the present disclosure. Although the following description of FIG. 3 is discussed as being performed by the event assessment system 102, it should be understood that any suitable computing device may perform the method 300 in any suitable order.

In process block 302, the event assessment system 102 may receive area data. As previously discussed, the area data may include information (e.g., location data, visual data) for surrounding structures (e.g., buildings, dwelling, bridges), weather data, and the like for a particular area received from the various data sources discussed in FIG. 1 (e.g., the vehicles systems 108, the video system 110, the drone 120). In process block 304, the event assessment system 102 may generate a visualization (e.g., a virtual model, map, 3D map, virtual reality display, a 3D physical map of a structure (using a 3D printer), a 3D physical map of an area) of the area based on the area data.

Figure 4:
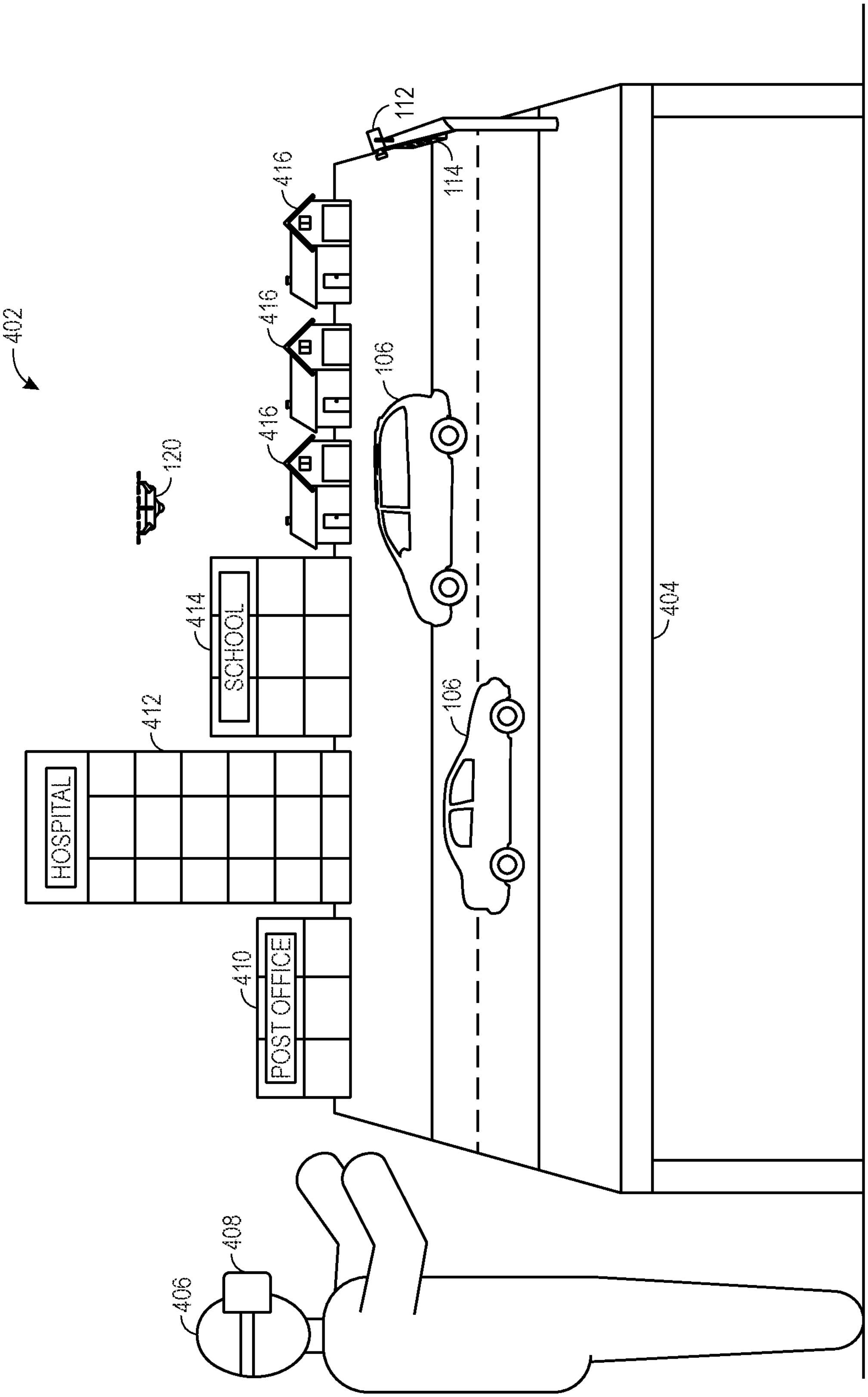
FIG. 4 is an example illustration of a visualization based on the area data, in accordance with aspects of the present disclosure.

FIG. 4 is an example illustration of a visualization that may be generated based on the area data, according to an embodiment of the present disclosure. In some embodiments, the event assessment system 102 may generate the visualization and send it to a headset 408 worn by a user 406. The headset 408 may project a visualization 402 on a station 404. The station 404 may include a table, floor, or other suitable surface that may be empty or free from objects, such that the headset 408 may present the visualization 402 without obstruction. The headset 408 may be an AR/VR headset and may include the event assessment system 102 therein or may be communicatively coupled to the event assessment system 102. Using the headset 408 and the visualization 402 generated by the event assessment system 102, the headset 408 may present the visualization 402 and display the visualization 402 on the station 404. The visualization 402 may include a 3D visualization appearing to be projected onto a surface of the station 404. The visualization 402 may include AR/VR representations of the area based on historical area data (e.g., flood maps, elevation maps, geological survey data) and real-time area data (e.g., level of traffic).

The visualization 402 may include representations of buildings in the area such as a post office building 410, a hospital 412, a school 414, and dwellings 416 (e.g., houses, apartment buildings, condominiums). The visualization 402 may also include representations of other fixtures of the area such as the traffic light 114, the camera 112, and so on. The visualization 402 may also include a representations of the vehicles 106 and the individuals 124 in the area. The visualization 402 may also use proprietary data such as insurance risk data from one or more insurance providers that may be obtained by the event assessment system 102. The insurance risk data may include loan risks and payment risks based on the likelihood of an event occurring in the area. The visualization 402 may also include data such as likelihood of future military deployments to an area.

The user 406 may manipulate the visualization 402 by performing a hand gesture or voice command to zoom in to enlarge the visualization 402 to get a closer perspective on the area or objects in the area, may perform another gesture or voice command to zoom out to more easily view a greater portion of the area, may perform yet another gesture or voice command to rotate the visualization 402 along multiple axes to view the area from different vantage points, and so on. The visualization may also include icons or tokens representing certain data (e.g., an icon representing monetary transfers from automated teller machines (ATMs), an icon representing a home or vehicle with a high likelihood of default). The icons may be selected by the user 406 using a gesture or voice command, and the icons may expand to display additional data based on the selection.

Any of the data mentioned above may be selected or unselected by the user 406. For instance, the user 406 may select to view a flood map and elevation map on the visualization 402 but may unselect the geological survey data and the monetary transfer icons (e.g., to reduce visual clutter). It should be noted that the visualization 402 may be accessible by other computing systems, such that each computing system may view the same visualization 402 remotely. For example, a fire department may view the visualization 402 using the headset 408 and the station 404 in one location, while a police department may utilize another computing system in another location, while a non-governmental entity may view the visualization 402 in yet another location. By allowing multiple computing systems to view the same visualization 402, the various users 406 may communicate and interact with each other to generate emergency response plans.

Figure 5:
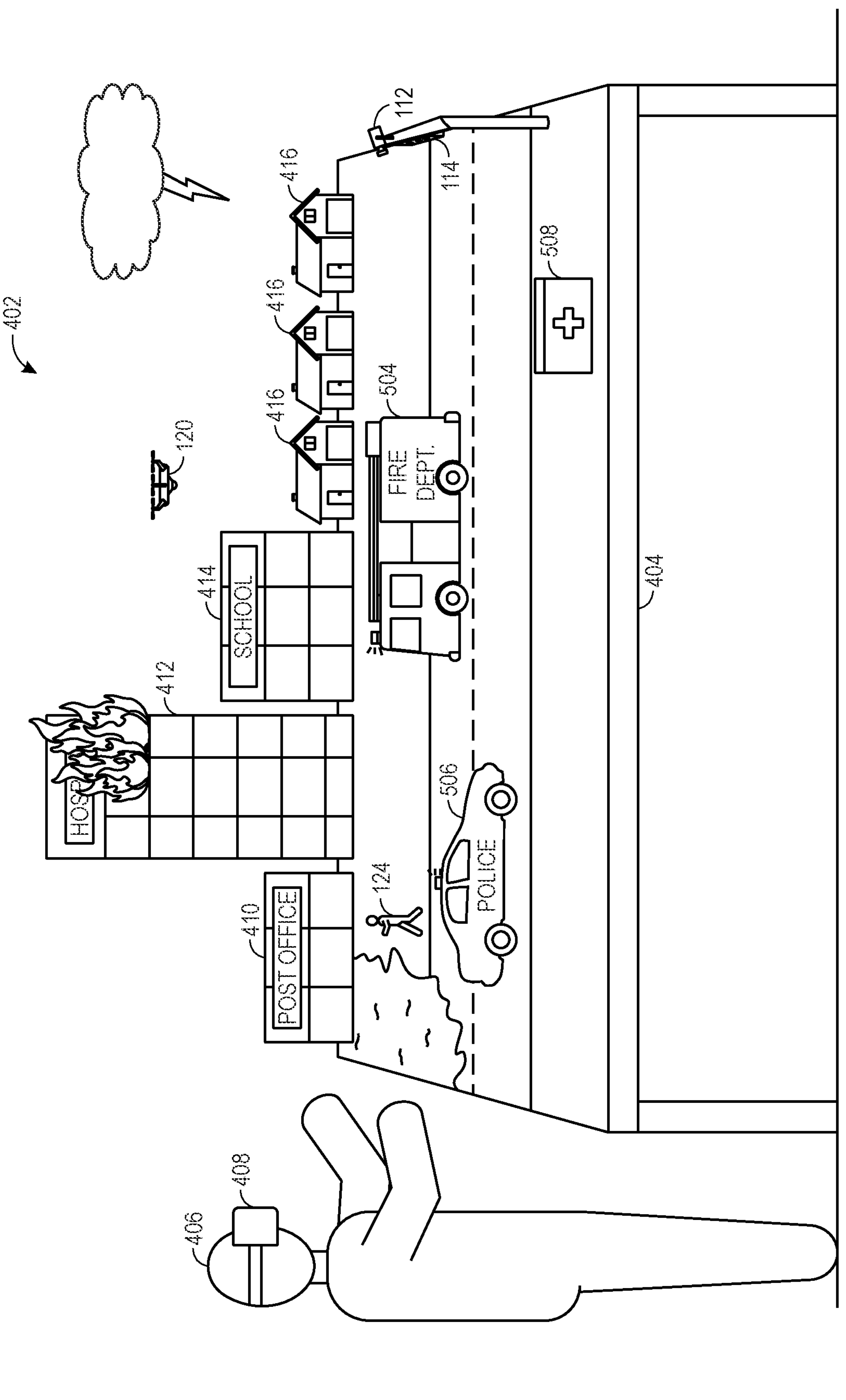
FIG. 5 is an example illustration of the visualization of FIG. 4, the visualization modified based on updated area data, event data, and emergency resource data, in accordance with aspects of the present disclosure.

In process block 306, the event assessment system 102 may receive event data. As previously discussed, the event data may include data regarding weather events, conflagrations or other fire events, flooding, and so on. The event assessment system 102 may update the visualization 402 to reflect the changes to the area due to the one or more events. FIG. 5 is an example illustration of the visualization 402 modified based on the updated area data, the event data, and the emergency resource data, according to an embodiment of the present disclosure. The visualization 402 may be updated with the event data received by the event assessment system 102 from the data sources discussed in FIG. 1. For example, the event assessment system 102 may receive from the sensors 118 (e.g., a water level sensor) data indicating a flood in the post office building 410, may receive, from the drones 120, data indicating a blaze in the hospital 412, and may receive, from the social media 122, data indicating a storm over the dwellings 416. It should be noted that this is merely one example, and emergency events may be determined via any of the devices and/or sensors discussed with respect to FIG. 1.

In process block 308, the event assessment system 102 may receive available emergency resources data. The event assessment system 102 may receive the available emergency resources data via the data sources described in FIG. 1 (e.g., the vehicle system 108, the video system 110, the cameras 112) or directly from the emergency response organizations using the event assessment system 102, which may send updates regarding the available emergency resource data (e.g., in real time, periodically, and so on). The emergency resources data may include a number and location of emergency response personnel, vehicles, equipment, supplies 508 (e.g., medical supplies, blankets, food, water, clothing, hospital beds, hospital operating rooms, etc.) and the like. For example, the emergency resources data may include the location of a fire engine 504, a squad car 506, and other emergency vehicles or equipment in or near the area as well as the location and contents of the supplies 508.

In process block 310, the event assessment system 102 may determine multiple emergency response plans for the area based on the event data and the emergency resource data. In the process block 310, the event assessment system 102 may determine multiple emergency response plans to address the flooding of the post office building 410, the blaze in the hospital 412, and the evacuation of the school 414 before the blaze spreads to the school 414. In some embodiments, the emergency response plans may include determining desirable (e.g., fastest, most efficient) routes away from a congested area or to the area undergoing the event, as this may assist in evacuation. In other embodiments, the emergency response plans may include determining desirable routes towards the congested area or the area undergoing the event, as this may assist emergency responders in carrying out the emergency response plans efficiently and effectively. To determine event assessment system 102 may determine the desirable routes by utilizing traffic and route data from one or more mapping applications. In still other embodiments, the emergency response plans may include sending out information such as shelter-in-place or evacuation instructions (e.g., for protection during aerial attack, artillery shelling, small arms combat, or associated combat events).

In some embodiments, the user 406 may determine a response plan based on the event data and the emergency resource data. In other embodiments, the event assessment system 102 may utilize artificial intelligence (AI) or machine learning algorithms to analyze the event data and the emergency resource data, run multiple emergency response plan simulations and, based on the simulations, determine one or more response plans. For example, the AI or machine learning algorithms may simulate emergency response plans based on an anticipated number of people in the area, an anticipated level of traffic, an anticipated level of flooding, an anticipated path of the fire, and so on. In some embodiments, the event assessment system 102 may present the potential response plans to the user 406 and allow the user 406 to select a response plan (e.g., via gesture or voice command). In another embodiment, the event assessment system 102 may choose the response plan based on the analyzed data and simulations without input from the user 406.

The multiple emergency response plans may include extraction/evacuation, fire response, police response, and so on. For example, the event assessment system 102 may determine the location and health status (e.g., by monitoring wearable devices) of the individuals 124. If it is determined that the individuals 124 are within a threshold distance of a location that corresponds to some event (e.g., fire), the event assessment system 102 may determine an emergency response plan prioritizing extracting the individuals 124. Additionally, the event assessment system 102 may send an alert to the individuals 124 (e.g., a text message or push notification to a phone or wearable device) alerting the individuals 124 to the emergency event, sending information pertaining to the emergency resources (e.g., supplies, personnel) in the area, and/or potential response strategies, including anticipated time and location of extraction.

In process block 312, the event assessment system 102 may identify a set of locations in the area to implement the multiple response plans. The event assessment system 102 may identify the set of locations in the area by identifying (e.g., via the area data, the event data, or the emergency resource data) areas of interest. Areas of interest may include the area(s) in which the event is occurring, areas of increased vulnerability (e.g., hospitals, schools, nursing homes), areas in which emergency response personnel are stationed or areas that emergency response personnel may easily access, and so on. For example, the event assessment system 102 may identify that the post office building 410 and surrounding area is flooding and that a blaze has erupted in the hospital 412. In the process block 312, the event assessment system 102 may identify that, due to the flooding, it may be advantageous for emergency responders to approach from the East rather than the West. Additionally, one or more of the response plans may prioritize the hospital 412 and the school 414 to extract individuals due to the nature of the potentially vulnerable individuals in those locations and the severity of the events, among other considerations. Further, the event assessment system 102 may identify one or more optimal extraction locations and send an alert to the individuals 124 in identified for extraction. The alert may include one or more extraction locations, routes that enable the individuals 124 to safely travel from their current location to the extraction location, and so on.

In process block 314, the event assessment system 102 may generate layer data for the visualization 402 for each respective response plan based on the set of locations. For example, one data layer may include an evacuation response plan, another data layer may include fire response, yet another data layer may include flood response, and so on. In process block 316, the event assessment system 102 may receive a selection (e.g., via the user 406) of one or more of the data layers. The user 406 may select the data layers via one or more interactions with the visualization 402, such as by using gestures (e.g., gesturing towards the desired layer(s) in a virtual list of data layers), by using voice commands, and so on.

In some embodiments, only one data layer may be selected by the user 406. In other embodiments, multiple data layers may be selected and overlaid on top of each other such that the various data layers corresponding to various response plans may be viewed simultaneously. For example, if the user 406 is using the computing system on behalf of a local fire department, the user 406 may select a fire event layer and an extraction layer, while another user 406 using the computing system on behalf of a local police department or on behalf of the U.S. Coast Guard may select the flood layer and the extraction layer, and so on.

In process block 318, the event assessment system 102 may modify the visualization 402 based on the selection of the one or more data layers. In some embodiments, the visualization 402 may remove or hide the unselected data layers such that they are invisible to the user 406. In other embodiments, the visualization 402 may highlight the selected data layers, such that the unselected data layers are still visible to the user 406.

In process block 320, the event assessment system 102 may receive (e.g., via the event assessment system 102) updated area data, event data, and/or emergency resource data. The updated area data may include any changes to the area as a result of the event or responses to the event, such as damage to buildings, impacted roads and sidewalks, and so on. The updated event data may include any developments to the event, such as an increase or decrease in flooding, worsening or dissipating of a storm, aggravation or dissolution of a social unrest event, and so on. The updated emergency resource data may include changes of the location or number of emergency personnel, vehicles, equipment, and so on.

Figure 6:
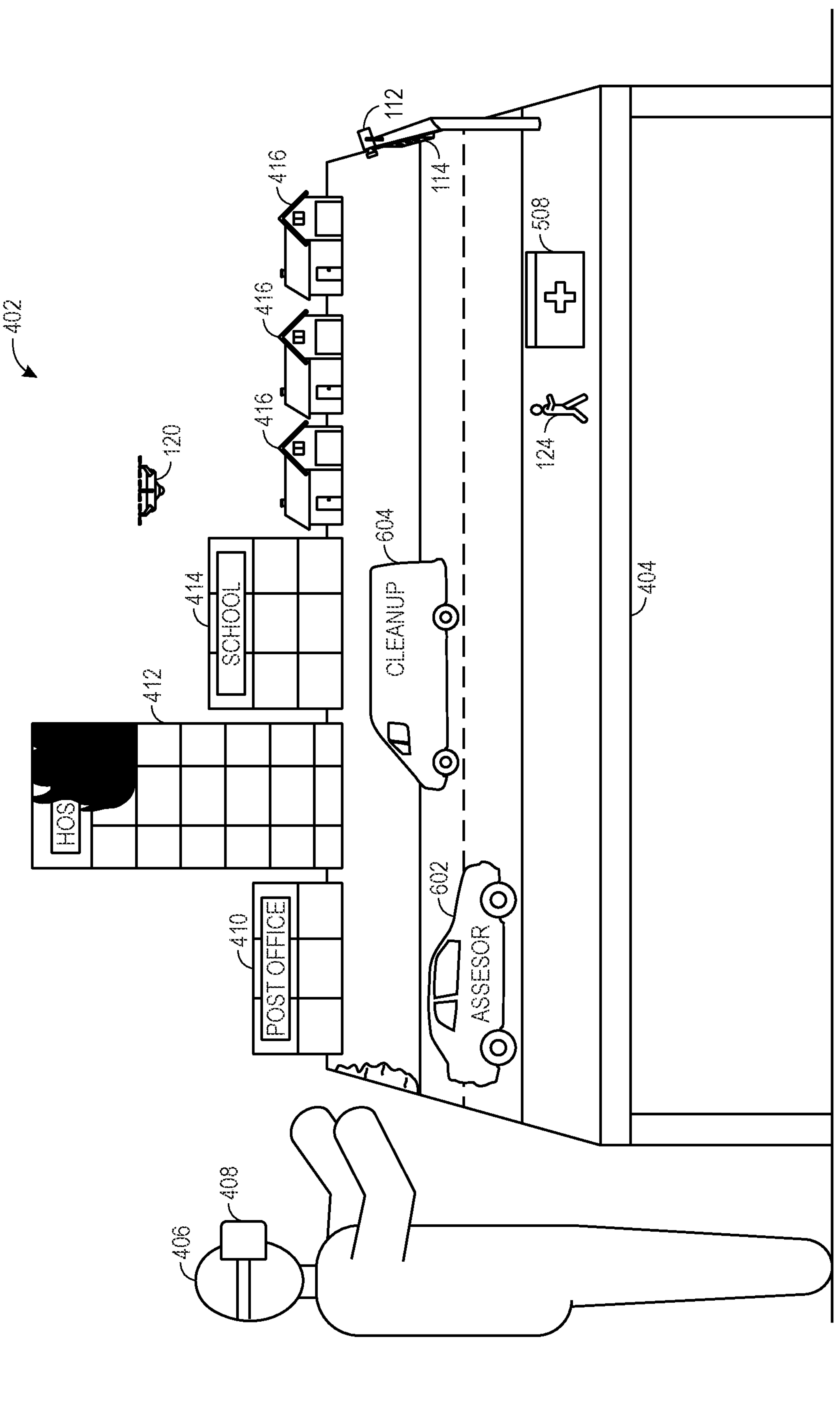
FIG. 6 is another example illustration of the visualization of FIG. 4, the visualization modified based on the updated area data, updated event data, and updated emergency resource data, in accordance with aspects of the present disclosure.

In process block 322, the event assessment system 102 may update the visualization 402 and the data layers based on the updated area data, event data, and/or emergency resource data. FIG. 6 is an illustration of a modified version of the visualization 402 based on the updated area data, the updated event data, and the updated emergency resource data, according to an embodiment of the present disclosure. For example, the visualization 402 may, upon being modified based on the updated area data, event data, and emergency resource data, reflect the changes to the area. As may be observed in FIG. 6, the visualization 402 may reflect the subsidence of the flood waters from the post office building 410 (e.g., based on the updated event data), the damage incurred by the hospital 412 after the blaze (e.g., based on the updated area data and/or the updated event data), and the presence of assessors 602 and disaster cleanup and restoration crews 604. The visualization 402 may also include updates on the locations and/or amount of the supplies 508 remaining, such that the various entities involved in the emergency response planning may replace or supplement the supplies 508 as needed.

The event assessment system 102 may (e.g., via the network 104) communicate one or more selected emergency response plans to emergency response personnel in the field. The emergency response plan may include the various area data, event data, and emergency resource data discussed previously. In some embodiments the response plan may be sent to electronic devices (e.g., cellular phones, laptop computers) of the emergency response personnel. In other embodiments, the response plan may be sent to the vehicles systems 108 of one or more of the vehicles 106 (e.g., a police cruiser, an ambulance, a fire engine). In some embodiments, the vehicles 106 may be self-driving autonomous vehicles.

The autonomous vehicles may utilize the area data, event data, and emergency resource data, as well as functionality of the event assessment system 102 to facilitate the emergency response plans. For example, the emergency response plan may include location data indicating an extraction area and a relocation area. An autonomous vehicle may determine a route to the extraction area and communicate with the traffic lights 114 along the route to enable the autonomous vehicle to more quickly reach the extraction area (e.g., by providing green lights along the route to the extraction area and providing red lights to cross-traffic). The autonomous vehicle may determine a route between the extraction area and the relocation area and communicate with the traffic lights 114 (e.g., an aerial vehicle can ignore traffic lights but may negotiate a route in coordination with other aerial objects and tall objects like buildings and towers; likewise, a waterborne vehicle would negotiate the best water route) to facilitate extraction and relocation (e.g., by providing green lights along the route between the extraction area and the relocation area and by providing red lights to cross-traffic). In this way, the autonomous vehicle may autonomously travel to various areas of interest while minimizing or eliminating hazards, obstacles, and/or interruptions.

Further, the event assessment system 102 may communicate (e.g., via the network 104) one or more selected emergency response plans to various electronic devices communicatively coupled to the event assessment system 102, such as a sprinkler system, drones, power switches, water/gas valves, and so on. The event assessment system 102 may, for example, send instructions triggering an emergency sprinkler system in response to detecting a fire, may send instructions causing a valve to close at a dam upstream from a flooding event, and so on.

In this manner, the disclosure provides benefit by leveraging sensors, monitors, and other technology embedded in an area to obtain information regarding an area, an event, and/or emergency resources that may assist in effectuating an emergency response to the event. The information obtained may enable multiple emergency response organizations to quickly and easily share additional data, cooperate, and coordinate in a way that would be difficult or impossible without embodiments disclosed herein. The disclosure also enables communication and interoperability between various systems and data sources.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method, comprising:

receiving, via at least one processor, data from a plurality of data sources disposed within an area, the data comprising area data, emergency event data, and emergency resource data;

generating, via the at least one processor, based on the data, a visualization comprising a graphical representation of the area based on the area data, the emergency event data, the emergency resource data, or any combination thereof;

determining, based on an interaction with the visualization, an emergency response plan for a vehicle, wherein the emergency response plan comprises an evacuation plan;

sending the emergency response plan to a vehicle system associated with the vehicle, wherein the vehicle system is configured to:

determine a location associated with the emergency response plan;

determine a route to the location; and send instructions to one or more traffic assets along the route to the location, the instructions configured to cause the one or more traffic assets to adjust one or more signals.

2. The method of claim 1, wherein the one or more traffic assets comprise one or more traffic lights.

3. The method of claim 2, wherein the one or more traffic lights are configured to adjust the one or more signals to produce one or more lights that correspond to a stop signal.

4. The method of claim 1, wherein the plurality of data sources comprises a plurality of sensors disposed within a smart city, a drone, one or more electronic devices positioned in the area, or any combination thereof.

5. The method of claim 4, comprising:

receiving location data corresponding to one or more users in the area;

determining that the one or more users are within a threshold distance of a location based on the location data; and sending an alert to one or more devices associated with the one or more users in response to determining that the one or more users are within the threshold distance of the location.

6. The method of claim 5, wherein the alert comprises at least a portion of the emergency event data, the emergency resource data, the emergency response plan, or any combination thereof.

7. The method of claim 1, wherein the visualization is associated with a plurality of data layers, wherein each data layer of the plurality of data layers is displayable via the visualization in response to receiving a selection of a respective data layer.

8. The method of claim 7, wherein each layer of the plurality of data layers corresponds to at least a portion of the area data, the emergency event data, the emergency resource data, or any combination thereof.

9. A system, comprising:

a plurality of devices configured to receive and transmit data comprising area data, emergency event data, and emergency resource data;

an event assessment system configured to:

receive the data from the plurality of devices;

generate a visualization based on at least a portion of the data, the visualization comprising a graphical representation of the area based on the area data, the emergency event data, and the emergency resource data;

determine a response plan based on an interaction with the visualization, wherein the response plan comprises an evacuation plan;

send the data to a vehicle, causing the vehicle to:

determine a location associated with the response plan;

determine a route to the location; and send instructions to one or more traffic assets along the route to the location, the instructions causing the one or more traffic assets to emit a signal.

10. The system of claim 9, wherein the area data comprises location data and visual data corresponding to structures within a particular area, a condition of the structures, weather data, vehicle traffic, pedestrian traffic, or any combination thereof.

11. The system of claim 9, wherein the event data comprises an indication of a type of event, information pertaining to damage to a particular area due to an event, location of the event, or any combination thereof.

12. The system of claim 9, wherein emergency resource data comprises a number of emergency response personnel, locations corresponding to the emergency response personnel, a number of emergency response vehicles, locations corresponding to the emergency response vehicles, locations corresponding to emergency equipment, or any combination thereof.

13. The system of claim 9, wherein the event assessment system is configured to update the visualization based on updated vehicle location data pertaining to the vehicle.

14. The system of claim 9, wherein the visualization is associated with a plurality of data layers, wherein each data layer of the plurality of data layers is displayable via the visualization in response to receiving a selection of a respective data layer.

15. The system of claim 9, wherein the interaction with the visualization comprises a hand gesture, a voice command, or both.

16. The system of claim 9, wherein the event assessment system is configured to:

receive location data corresponding to one or more users in the area;

determining that the one or more users are within a threshold distance of a location based on the location data; and sending an alert to one or more devices associated with the one or more users in response to determining that the one or more users are within the threshold distance of the location.

17. A tangible, non-transitory, computer-readable medium comprising computer-executable instructions that, when executed by one or more processors, cause the one or more processors to:

receive, via at least one processor, data from a plurality of data sources disposed within an area, the data comprising area data, emergency event data, and emergency resource data;

generate, via the at least one processor, based on the data, a visualization comprising a graphical representation of the area based on the area data, the emergency event data, the emergency resource data, or any combination thereof;

determine, based on an interaction with the visualization, an emergency response plan for a vehicle, wherein the emergency response plan comprises an evacuation plan;

send the emergency response plan to a vehicle system associated with the vehicle, wherein the vehicle system is configured to:

determine a location associated with the emergency response plan;

determine a route to the location; and send instructions to one or more traffic assets along the route to the location, the instructions configured to cause the one or more traffic assets to adjust one or more signals.

18. The tangible, non-transitory computer readable medium of claim 17, wherein the area data comprises location data and visual data corresponding to structures within a particular area, a condition of the structures, weather data, vehicle traffic, pedestrian traffic, or any combination thereof, the event data comprises an indication of a type of event, information pertaining to damage to a particular area due to an event, location of the event, or any combination thereof, and wherein the emergency resource data comprises a number of emergency response personnel, locations corresponding to the emergency response personnel, a number of emergency response vehicles, locations corresponding to the emergency response vehicles, locations corresponding to emergency equipment, or any combination thereof.

19. The tangible, non-transitory computer readable medium of claim 17, wherein the one or more traffic assets comprise one or more traffic lights.

20. The tangible, non-transitory computer readable medium of claim 19, wherein the one or more traffic lights are configured to adjust the one or more signals to produce one or more lights that correspond to a stop signal.

* * * * *